(12) United States Patent
Casalprim Torres et al.

(10) Patent No.: US 12,434,440 B2
(45) Date of Patent: Oct. 7, 2025

(54) ADJUSTMENTS OF LATTICE STRUCTURES OF 3D PARTS

(71) Applicant: Peridot Print LLC, Palo Alto, CA (US)

(72) Inventors: Marc Casalprim Torres, Sant Cugat del Valles (ES); Alberto María Canals Pou, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 368 days.

(21) Appl. No.: 17/933,655

(22) Filed: Sep. 20, 2022

(65) Prior Publication Data

US 2024/0092028 A1    Mar. 21, 2024

(51) Int. Cl.
    *B29C 64/393* (2017.01)
    *B33Y 50/02* (2015.01)
    *G06T 17/20* (2006.01)

(52) U.S. Cl.
    CPC ............ *B29C 64/393* (2017.08); *B33Y 50/02* (2014.12); *G06T 17/205* (2013.01); *G06T 2210/36* (2013.01)

(58) Field of Classification Search
    CPC .................................................. B29C 64/393
    See application file for complete search history.

(56) References Cited

U.S. PATENT DOCUMENTS

| | | | | |
|---|---|---|---|---|
| 9,920,429 | B2 * | 3/2018 | Carlsten | C23C 18/1641 |
| 2019/0111590 | A1 * | 4/2019 | Trivedi | B29C 33/3835 |
| 2019/0113091 | A1 * | 4/2019 | Trivedi | B29C 64/40 |
| 2020/0034496 | A1 * | 1/2020 | Michiels | G06F 30/00 |
| 2020/0122405 | A1 * | 4/2020 | Bigos | G06T 17/205 |
| 2020/0316835 | A1 * | 10/2020 | Ellis | B29C 45/2673 |
| 2023/0172314 | A1 * | 6/2023 | Ames | A43B 13/14 |
| | | | | 36/45 |
| 2023/0241839 | A1 * | 8/2023 | Canals Pou | B33Y 30/00 |
| | | | | 700/119 |

OTHER PUBLICATIONS

Aziz, A. R., et al., "Geometrical Scaling Effects in the Mechanical Properties of 3D-Printed Body-Centered Cubic (BCC) Lattice Structures," Polymers, Nov. 17, 2021, pp. 1-21.

Vannutelli, R., "Mechanical Behavior of 3D Printed Lattice-Structured Materials," Youngstown State University, Dec. 2017, 112 pages.

* cited by examiner

*Primary Examiner* — Suresh Suryawanshi
(74) *Attorney, Agent, or Firm* — Michael Dryja (57) ABSTRACT

In some examples, a system applies a first adjustment factor to a first representation of a first lattice structure of a first three-dimensional (3D) part to generate a first adjusted representation of the first lattice structure, the first representation comprising a representation of beams of the first lattice structure without a thickness. The system applies a second adjustment factor to a second representation of a second lattice structure of a second 3D part to generate a second adjusted representation of the second lattice structure, the second representation comprising a representation of beams of the second lattice structure without a thickness. The system adds beam thicknesses to the first and second adjusted representation to provide respective digital models of the first and second 3D parts that are useable by an additive manufacturing machine in building the first and second 3D parts in respective build regions of a build bed.

20 Claims, 5 Drawing Sheets

ADJUSTMENTS OF LATTICE STRUCTURES OF 3D PARTS

BACKGROUND

Additive manufacturing machines produce three-dimensional (3D) objects by building up layers of build material, including a layer-by-layer accumulation and solidification of the build material patterned from computer aided design (CAD) models or other digital representations of physical 3D objects to be formed. A type of an additive manufacturing machine is referred to as a 3D printing system. Each layer of the build material is patterned into a corresponding part (or parts) of the 3D object.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Additive manufacturing machines can be used to build three-dimensional (3D) parts with lattice structures. A lattice structure refers to a physical structure having an interlaced pattern of connecting members that are interconnected with one another. The connecting members can be referred to as "beams." A beam can refer to a generally elongated member within the lattice structure. The beam can be straight, can be curved, or can have a more complex shape than merely being straight or curved. The beams interconnect nodes of the lattice structure. A "node" refers to a point at which beams connect to one another.

A lattice structure can include an arrangement of unit cells that in combination define a 3D part. In some examples, a same collection of unit cells (a single unit cell or multiple unit cells in the collection) is repeated and interconnected to one another to define a lattice. A "unit cell" of a lattice structure includes an arrangement of beams that interconnect nodes of the unit cell. In other examples, the unit cells making up the lattice structure can be heterogeneous (i.e., different from one another).

Examples of 3D parts with lattice structures can include human wearable products such as footwear, dental prosthetics, gloves, clothing, splints, braces, headwear, and so forth. As other examples, 3D parts with lattice structures can include products that are provided to support a user, such as seat cushions, child seats, mattresses, and so forth. Other examples of 3D parts with lattice structures can also be built using additive manufacturing machines.

A digital representation of a 3D part including a lattice structure to be built can be provided to an additive manufacturing machine to allow the additive manufacturing to build the 3D part on a layer-by-layer basis. The digital representation of the 3D part can include a computer aided design (CAD) model, which can have any of various formats, such as a Standard Tessellation Language (STL) format, an OBJ format, an Additive Manufacturing File (AMF) format, a 3D Manufacturing Format (3MF), and so forth.

The digital representation of a target 3D part that includes a lattice structure includes an arrangement of the lattice cells that make up the lattice structure. The digital representation specifies an interconnection of the lattice cells to form the target 3D part. The additive manufacturing machine builds the arrangement of lattice cells on a layer-by-layer basis.

In some examples, a build material used by an additive manufacturing machine can include a powdered build material that is composed of particles in the form of fine powder or granules. The powdered build material can include plastic particles, polymer particles, ceramic particles, glass particles, or particles of other powder-like materials.

As part of the processing of each layer of build material, such as used with multi jet fusion (MJF) 3D printing, liquid agents can be dispensed by liquid agent dispensers (such as through a printhead or another fluid dispensing device) of the additive manufacturing machine onto the layer of build material. In some examples, the applied liquid agents can include a fusing agent (which is a form of an energy absorbing agent including, for example, carbon black particles) that absorbs heat energy emitted from an energy source used in the additive manufacturing process. For example, after a build material layer is deposited onto a build platform (or onto a previously formed build material layer) in the additive manufacturing machine, a fusing agent with a target pattern can be deposited onto portions of the build material layer, to assist in melting of the build material layer portions.

Another liquid agent that can be applied to a build material layer is a detailing agent, which does not absorb heat energy emitted from the energy source. In some examples, the detailing agent can be applied to an edge boundary portion of the areas in which the fusing agent is deposited, to provide a cooling effect at the edge boundary portion. The presence of the detailing agent combats the effect of coalescence bleed caused by fusing due to heating in adjacent portions of the build material layer. The detailing agent can thus help in defining more accurate boundary portions of a 3D part.

In other examples, instead of using liquid agents, selective laser sintering (SLS) 3D printing can be employed in which a laser source is used to solidify a layer of powdered build material.

In further examples, a build material can include a photocurable resin or another curable material that can be cured from liquid form to a solid form using a light source such as laser (such as used in stereolithography (SLA) 3D printing).

Building a lattice structure with an additive manufacturing machine can allow for better control of mechanical characteristics of the lattice structure than possible with other manufacturing techniques. For example, a digital representation of the lattice structure can be adjusted to change mechanical properties (e.g., compressibility, stiffness, density, mechanical strength, kinetic energy dissipation, kinetic energy return, deceleration, etc.) of the lattice structure.

An additive manufacturing machine can form a collection of 3D parts (a "collection" can include a single 3D part or multiple 3D parts) on a build bed. A "build bed" refers to an area of the additive manufacturing machine in which an additive manufacturing process is performed to build the collection of 3D parts on a layer-by-layer basis. Initially, before any layer of build material is applied, the build bed can include the upper surface of a build platform of an additive manufacturing machine. A first layer of build material is spread over the build platform, and with MJF 3D printing, the first layer of build material is then processed by applying liquid agent(s) followed by heating the first layer of build material (and possibly other processing action(s)). In other examples, SLS 3D printing or SLA 3D printing can be employed. At this point, the build bed includes the upper surface of the first layer of build material. Subsequently, further layers of build material are deposited and processed, which builds up the collection of 3D parts on a layer-by-layer basis. The build bed for each iteration of build material layer spreading and processing is the upper surface of the 3D part(s) formed by the processing of prior layer(s) of build material.

In some cases, non-uniformity in attributes of 3D parts can be observed across a build bed during a given additive manufacturing job. The attributes can include any or some combination of the following: a performance of a 3D part (e.g., a firmness, flexibility, strength, etc., of the 3D part), a geometric attribute of the 3D part (e.g., size, shape, etc.), or any other attribute. 3D parts built in a first build region of the build bed may have different attribute values from 3D parts built in a different second build region of the build bed. A "build region" of a build bed can refer to a specific area (e.g., in an X-Y plane) of the build bed, or a specific volume (e.g., in XYZ space) with respect to the build bed. The variability of the attributes of 3D parts can lead to poor yields or poor predictability in the attributes of the 3D parts built by additive manufacturing machines.

In some cases, variability of attributes of 3D parts across a build bed may be compensated for using a modification hardware or program (machine-readable instructions), based on extensive understandings by expert users of effects of control elements of an additive manufacturing machine and how they affect 3D parts being built. However, such techniques can be tedious and may not produce desired results.

In accordance with some implementations of the present disclosure, a system determines adjustment factors to apply to lattice structures for building the 3D parts using an additive manufacturing machine, where each lattice structure comprises nodes and beams interconnecting the nodes. The system applies each adjustment factor to a respective representation of a respective lattice structure, the representation of the respective lattice structure including a representation of the beams of the respective lattice structure without a thickness. The system adds a beam thickness to a respective adjusted representation of the respective lattice structure to provide a respective digital representation of a respective 3D part that is useable by the additive manufacturing machine in building the respective 3D part. In a 3D part, beam thicknesses can vary in different portions of the 3D part.

Applying an adjustment factor to a representation of a lattice structure having beams without a thickness means that the thickness of the beams is not adjusted based on the adjustment factor. However, the adjustment factor would adjust another geometric property of the lattice structure, such as a size of the lattice structure, a shape of the lattice structure, positions of nodes of the lattice structure, or any other geometric property of the lattice structure that if modified changes a geometrical aspect of a 3D part. If the adjustment factor is also applied on the thickness of the beams of the lattice structure, then the thickness of the beams will change, which can cause a mechanical property (compressibility, stiffness, density, mechanical strength, kinetic energy dissipation, kinetic energy return, deceleration, etc.) of the lattice structure to deviate from a target mechanical property. Small changes in beam thicknesses can lead to relatively large changes in the mechanical property of the lattice structure. By adjusting a geometric property of a lattice structure without changing beam thicknesses, better control of mechanical properties of the lattice structure can be achieved.

An input digital representation (e.g., an input CAD model) of a 3D part can specify dimensions (e.g., non-zero thicknesses) of beams in an initial lattice structure that forms the 3D part. A modified representation of the lattice structure can be produced from the input digital representation by replacing the beams having non-zero thicknesses with beams without thicknesses (also referred to as zero-thickness beams). This can be accomplished by substituting the non-zero thickness beams in the initial lattice structure with zero-thickness beams. After the adjustment of the lattice structure is performed based on applying an adjustment factor, the zero-thickness beams of the adjusted lattice structure are replaced with the beams having non-zero thicknesses as specified in the input digital representation.

Figure 1:
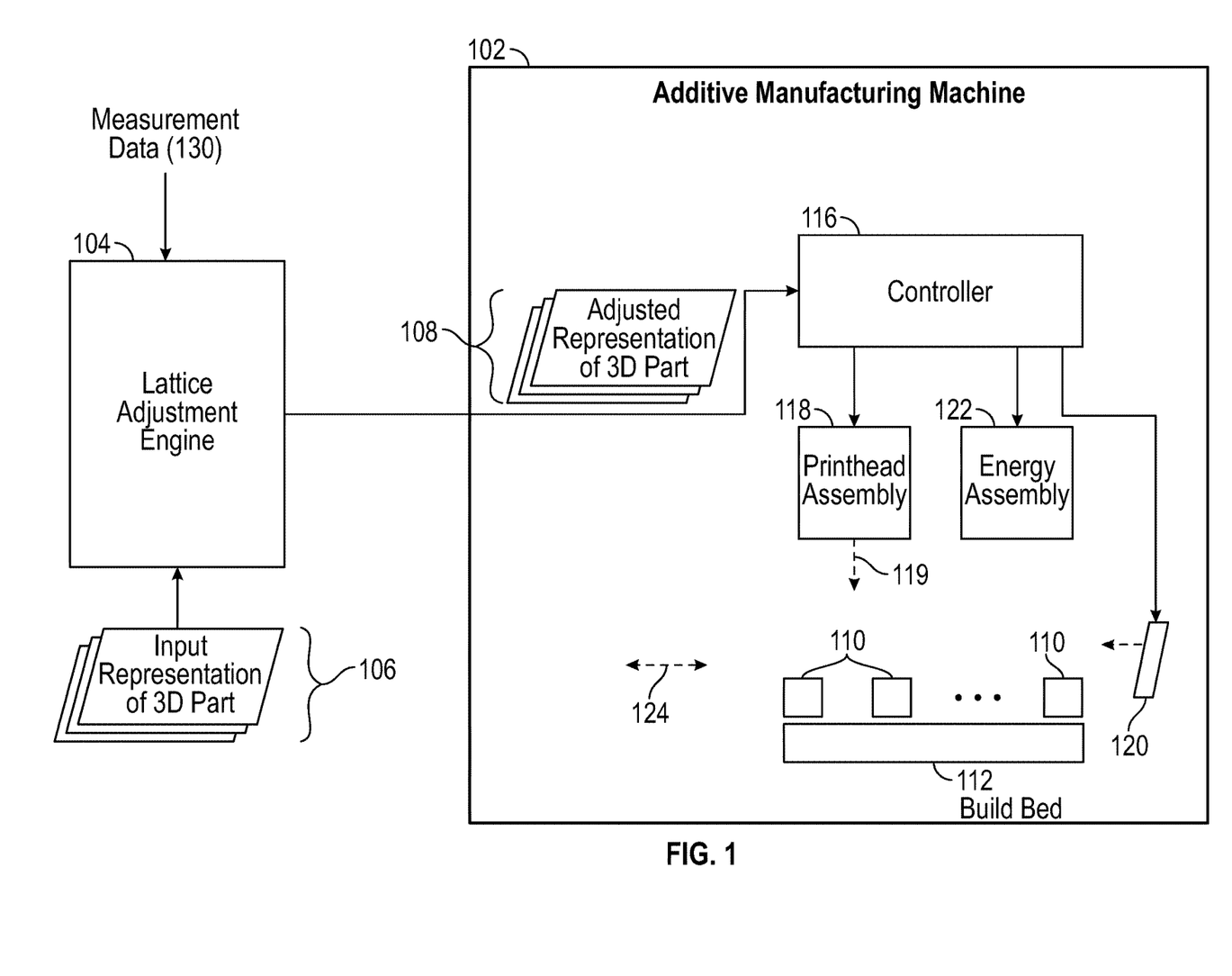
FIG. 1 is a block diagram of an arrangement that includes an additive manufacturing machine and a lattice adjustment engine to generate a digital representation of a three-dimensional (3D) part to be built by the additive manufacturing machine, according to some examples.

FIG. 1 is a block diagram of an example arrangement that includes an additive manufacturing machine 102 and a lattice adjustment engine 104 that adjusts lattice structures for 3D parts to be built by the additive manufacturing machine 102, in accordance with some implementations of the present disclosure.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In some examples, the lattice adjustment engine 104 is external of the additive manufacturing machine 102. For example, the lattice adjustment engine 104 can be implemented with a computer (or multiple computers). In other examples, the lattice adjustment engine 104 can be part of the additive manufacturing machine 102.

The lattice adjustment engine 104 receives a collection of digital representations of 3D parts 106, such as CAD models or other types of digital representations of 3D parts. The collection of input digital representations of 3D parts 106 can include a single digital representation or multiple digital representations. For example, multiple input digital representations of 3D parts may specify different types of 3D parts to be formed on a build bed 112 in a given build job of the additive manufacturing machine 102. Alternatively, the additive manufacturing machine 102 may build multiple instances of a 3D part across the build bed 112 using a single input digital representation of the 3D part.

In some examples, each input representation of a 3D part 106 includes a lattice structure of the 3D part. Each input representation of the 3D part 106 can specify non-zero thicknesses of beams in the lattice structure of the 3D part, where the non-zero thicknesses are the thicknesses of the beams desired to be built by a user.

The lattice adjustment engine 104 determines adjustment factors to apply to lattice structures for building 3D parts across the build bed 112. Different adjustment factors can be specified for different build regions of the build bed 112. For each given build region of the build bed 112, the lattice adjustment engine 104 applies an adjustment factor to a respective input representation of the 3D part 16. The adjustment factor is applied to the lattice structure of the input representation of the 3D part using zero-thickness beams of the lattice structure. A "zero-thickness beam" refers to a beam that is represented as a line (or more generally a curve) that has a non-zero length but that in another dimension (referred generally as a "thickness dimension") has a zero value (e.g., zero width, zero height, zero diameter, etc.). When a geometric property of a lattice structure is adjusted based on the adjustment factor, the dimension with the zero value is not adjusted, although the length of the zero-thickness beam may be adjusted.

After adjustment of the lattice structure of the input representation of the 3D part 106, the lattice adjustment engine 104 adds a beam thickness to the adjusted representation of the 3D part. Adding the beam thickness to the adjusted representation of the 3D part is accomplished by replacing the zero-thickness beams in the lattice structure of the adjusted representation of the 3D part with beams having non-zero thicknesses as specified in the input representation of the 3D part 106.

The lattice adjustment engine 104 re-iterates the foregoing adjustment of lattice structures built in other build regions of the build bed 112, which produces a collection of adjusted representations of 3D parts 108. The lattice adjustment engine 104 provides the collection of adjusted representations of 3D parts 108 to a controller 116 in the additive manufacturing machine 102.

The controller 116 can include a hardware processing circuit or a combination of the hardware processing circuit and machine-readable readable instructions executable on the hardware processing circuit. The controller 116 can control, based on the collection of adjusted digital representations of 3D parts 108, the building of 3D parts 110 during a build job. The 3D parts 110 are formed in different build regions of the build bed 112.

In some examples, an adjustment factor applied by the lattice adjustment engine 104 to a lattice structure of a 3D part can include a scaling factor to scale a geometric property of the lattice structure. As examples, the geometric property of the lattice structure can include any or some combination of the following: a size of the lattice structure, a shape of the lattice structure, positions of nodes of the lattice structure, or any other geometric property of the lattice structure that if modified changes a geometrical aspect of the 3D part.

Additionally or alternatively, an adjustment factor applied by the lattice adjustment engine 104 to a lattice structure of a 3D part can change a shape (another example of a geometric property) of the lattice structure. For example, the adjustment factor includes a unit cell type selected from among different unit cell types. A unit cell type refers to a type of unit cells that forms the lattice structure. Different types of unit cells can have different structures and shapes. For a lattice structure having unit cells of a given unit cell type, the lattice adjustment engine 104 can adjust a geometric property of each unit cell of the given unit cell type to adjust a lattice structure of a 3D part. For example, a first unit cell type can represent a unit cell having a cuboid shape, a second unit cell type can represent a unit cell having a pyramid shape, a third unit cell type can represent a unit cell having a spherical shape, and so forth.

The adjustment of any of the foregoing geometric properties of a lattice structure can cause a length or shape of a zero-thickness beam in the lattice structure to change, but the thickness dimension of the zero-thickness beam does not change.

The additive manufacturing machine 102 includes a printhead assembly 118 that is able to dispense a liquid agent 119 (or multiple liquid agents) during a build operation. The liquid agent(s) 119 can include any or some combination of the following: a fusing agent, a detailing agent, or another type of liquid agent.

The additive manufacturing machine 102 also includes a spreader 120 that is able to spread a build material onto the build bed 112. The spreader 120 can include a blade, a roller, or any other structure that is able to form a layer of build material on the build bed 112.

During a build operation, the spreader 120 can spread successive layers of build material onto the build bed 112. Each layer of build material is processed individually, based on application of the liquid agent(s) 119 by the printhead assembly 118.

The additive manufacturing machine 102 also includes an energy assembly 122 that can be activated to apply energy to each layer of build material after the liquid agent(s) has (have) been applied.

The printhead assembly 118 can include a collection of printheads (a single printhead or multiple printheads), where each printhead has an array of nozzles through which the liquid agent(s) 119 can be ejected onto a layer of build material on the build bed 112.

The energy assembly 122 can include a collection of heating lamps (a single heating lamp or multiple heating lamps) or other types of heating elements. In other examples, the energy assembly 122 can include a light source such as a laser array.

The controller 116 is able to control the operation of each of the printhead assembly 118, the energy assembly 122, and the spreader 120. The spreader 120 is movable along a generally horizontal axis (indicated as 124) over the build bed 112 to spread a layer of build material onto the build bed 112. In some cases, the spreader 120 can be moved in multiple orthogonal horizontal axes.

The controller 116 can also control movement of the printhead assembly 118 with respect to the build bed 112. The printhead assembly 118 can also be moved along a horizontal axis (or multiple horizontal axes). As the printhead assembly 118 is moved by the controller 116, the controller 116 can control the printhead assembly 118 to eject the liquid agent(s) 119.

At the appropriate time during a build operation (such as after the liquid agent(s) 119 has (have) been applied onto the layer of build material), the controller 116 can activate the energy assembly 122 to apply energy to the layer of build material.

Figure 2:
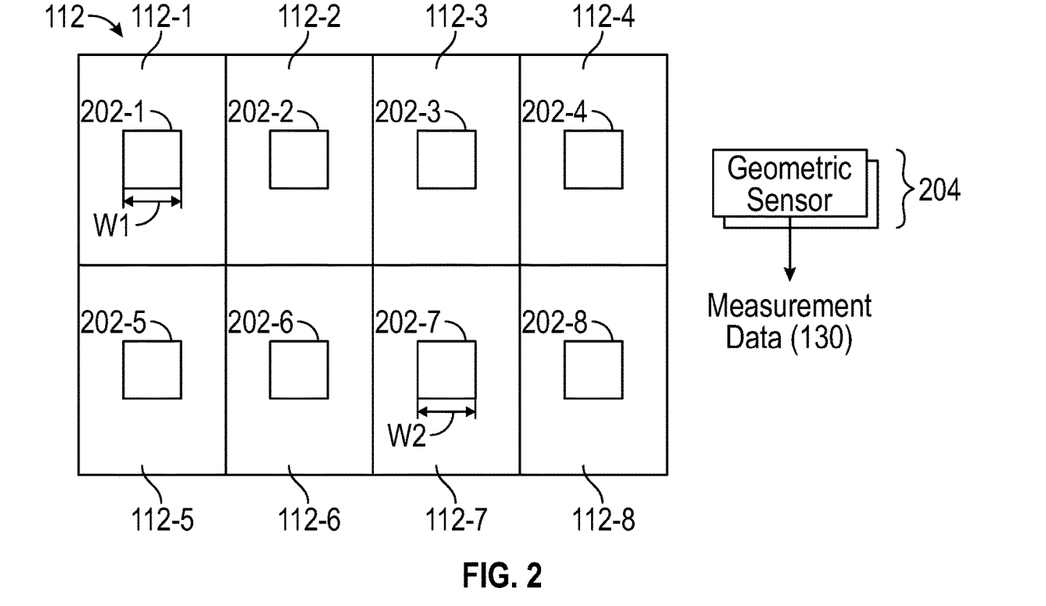
FIG. 2 is a schematic diagram illustrating formation of 3D parts in different build regions of a build bed where different lattice structure adjustments are made, in accordance with some examples.

FIG. 2 is a schematic top view of 3D parts 202-1 to 202-8 formed on an upper surface of the build bed 112. In some examples, the build bed 112 is divided into 8 different build regions 112-1, 112-2, 112-3, 112-4, 112-5, 112-6, 112-7, and 112-8. The 3D part 202-1 is formed in the build region 112-1, the 3D part 202-2 is formed in the build region 112-2, and so forth. Although FIG. 2 shows 8 build regions 112-1 to 112-8, in other examples, the build bed 112 can be divided into a different quantity of build regions. Also, a different quantity (greater than 1) of 3D parts may be built in each respective build region. In some examples, the different build regions can be build volumes defined in 3D space.

In some examples, the 3D parts 202-1 to 202-8 can be formed from the same representation of a 3D part. In other examples, some or all of the 3D parts 202-1 to 202-8 can be formed using different representations of 3D ports.

The 3D parts 202-1 to 202-8 can be test 3D parts built by an additive manufacturing machine, such as the additive manufacturing machine 102 or a different additive manufacturing machine. The test 3D parts are built to detect non-uniformities in attributes of 3D parts in the different build regions 112-1 to 112-8 of the build bed 112.

Once the 3D parts 202-1 to 202-8 are built on the build bed 112, a collection of geometric sensors 204 (a single geometric sensor or multiple geometric sensors) can be used to measure a collection of geometrical properties (a single geometrical property or multiple geometrical properties) of each 3D part. For example, a geometrical property measured by a geometric sensor 204 can be a size of a test 3D part. In other examples, a geometric sensor 204 can measure a different geometrical property, such as a shape or any other geometric property of a 3D part. Examples of geometric sensors 204 can include optical sensors. For example, an optical sensor can scan the outer profiles of each 3D part with light (e.g., laser) from a light source, and an optical detector can receive the reflected light as reflected by the outer surface of the 3D part to determine the geometrical property (e.g., size, shape, etc.) of the 3D part.

Measurement data 130 acquired by the collection of geometric sensors 204 is provided to the lattice adjustment engine 104 of FIG. 1. Based on the measurement data 130 from the collection of geometric sensors 204, the lattice adjustment engine 104 can determine an adjustment to be applied in each build region 112-1 to 112-8 of the build bed 112 when building a collection of 3D parts by the additive manufacturing machine 102.

For example, for each build region 112-$i$ ($i$=1 to 8), the lattice adjustment engine 104 can compare a geometric property represented by the measurement data 130 to a baseline geometric property. The baseline geometric property is a geometric property of a 3D part that is a target geometric property to be achieved when building the 3D part in the build region 112-$i$ based on an input representation of the 3D part 106. The comparing can identify a geometric deviation between the geometric property represented by the measurement data 130 and the baseline geometric property. The lattice adjustment engine 104 produces an adjustment factor to compensate for the identified geometric deviation.

In a simple example, as shown in FIG. 2, the test 3D part 202-1 built in the build region 112-1 has a width W1, while the test 3D part 202-7 built in the build region 112-7 has a width W2 that is different from W1. The widths W1 and W2 can be measured by the geometric sensors 204. In the simple example of FIG. 2, each test 3D part 202-1 to 202-8 is a cuboid with the same width along the three different axes (X, Y, and Z axes). The test 3D parts 202-1 and 202-7 may be built from the same input digital representation of a 3D part, so the test 3D parts 202-1 and 202-7 should have the same width. However, variations in the behavior of the additive manufacturing machine 102 when building 3D parts in the different build regions can result in the geometries of the 3D parts to vary, which can result in variable attributes (including those listed further above) across the build bed 112.

For example, the different widths W1 and W2 of the test 3D parts 202-1 and 202-7, respectively, can result in different attributes of the test 3D parts. The lattice adjustment engine 104 can compare the width of each test 3D part (e.g., including W1 and W2 as represented by the measurement data 130) to a baseline width BW, which is the target width based the input representation of the 3D part. The lattice adjustment engine 104 can determine a difference D1 between W1 and the baseline width BW, and a difference D2 between W2 and the baseline width BW. Note that D1 or D2 may be zero. For a non-zero difference, the lattice adjustment engine 104 derives a scaling factor to apply as the adjustment factor to the respective lattice structure. For example, if W1>BW, then the scaling factor applied is BW/W1 to reduce the width of the 3D part 202-1. If W1<BW, then the scaling factor applied is BW/W1 to increase the width of the 3D part 202-1.

In some examples, the reference to compare the geometric property represented by the measurement data 130 to the baseline geometric property can be to either: (1) comparing a single geometric property represented by the measurement data 130 to a single baseline geometric property, or (2) comparing multiple geometric properties represented by the measurement data 130 to multiple respective baseline geometric properties.

Figure 3A:
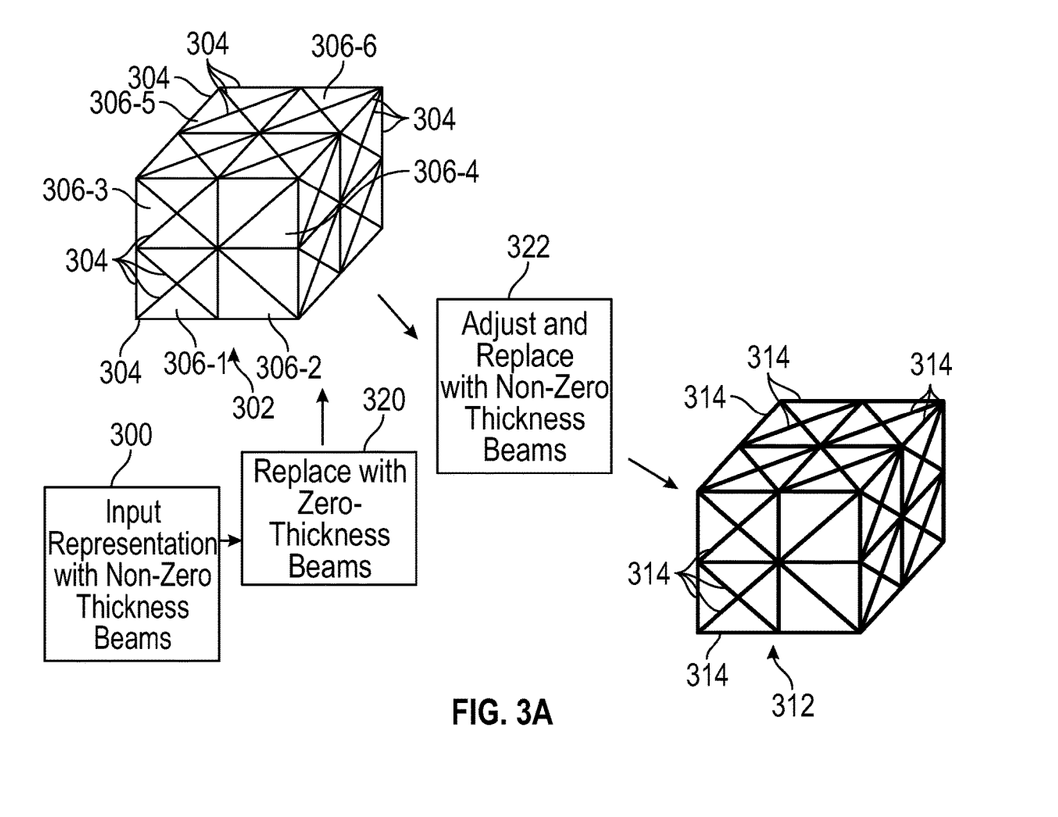
FIG. 3A is a schematic diagram illustrating an adjustment of a lattice structure performed by a lattice adjustment engine, in accordance with some examples.

FIG. 3A illustrates an example of adjusting a lattice structure represented by an input representation of a 3D part 300, in accordance with some examples. The lattice structure represented by the input representation of the 3D part 300 has non-zero thickness beams that interconnect nodes of the lattice structure to be built by an additive manufacturing machine. Based on the input representation of the 3D part 300, the lattice adjustment engine 104 replaces (at 320) the non-zero thickness beams in the lattice structure represented by the input representation of the 3D part 300 with corresponding zero-thickness beams to provide a lattice structure 302 with zero-thickness beams 304 that interconnect nodes of the lattice structure 302. The lattice adjustment engine 104 represents each zero-thickness beam as a line in the input lattice structure 302. More generally, a zero-thickness beam may be a curve in an input lattice structure.

Note that the data structure 302 may be formed of multiple unit cells, including unit cells 306-1, 306-2, 306-3, 306-4, 306-5, and 306-6 that are visible in the view of FIG. 3A. The generally cuboid lattice structure 302 shown in FIG. 3A has 8 unit cells. The unit cells of the data structure 302 can be identical to one another, or some or all of the unit cells of the data structure 302 may be different from one another.

The lattice adjustment engine 104 adjusts (at 322) the lattice structure 302 by applying an adjustment factor to modify a geometric property of the lattice structure 302 with the zero-thickness beams 304. Such an adjustment avoids changing the thickness of the beams 304, since the beams 304 remain at zero thickness even after the adjustment performed by the lattice adjustment engine 104. In some examples, the lattice adjustment engine 104 applying an adjustment factor to modify a geometric property of the lattice structure 302 can refer to either: (1) applying a single adjustment factor to modify a single geometric property of the lattice structure 302, or (2) applying multiple adjustment factors to modify multiple respective geometric properties of the lattice structure 302.

After the lattice structure 302 has been adjusted to modify a collection of geometric properties of the lattice structure, the lattice adjustment engine 104 replaces (at 322) the zero-thickness beams 304 (whose lengths may have been adjusted) in an output lattice structure 312 with beams 314 that have non-zero thicknesses. The lattice adjustment engine 104 identifies each zero-thickness beam in the output lattice structure 312 (produced based on the adjustment performed by the lattice adjustment engine 104) and substitutes the zero-thickness beam with a non-zero thickness beam 314 to replace the identified zero-thickness beam. The thickness of each non-zero thickness beam 314 is the same as specified by the input representation of the of a 3D part 300.

Figure 3B:
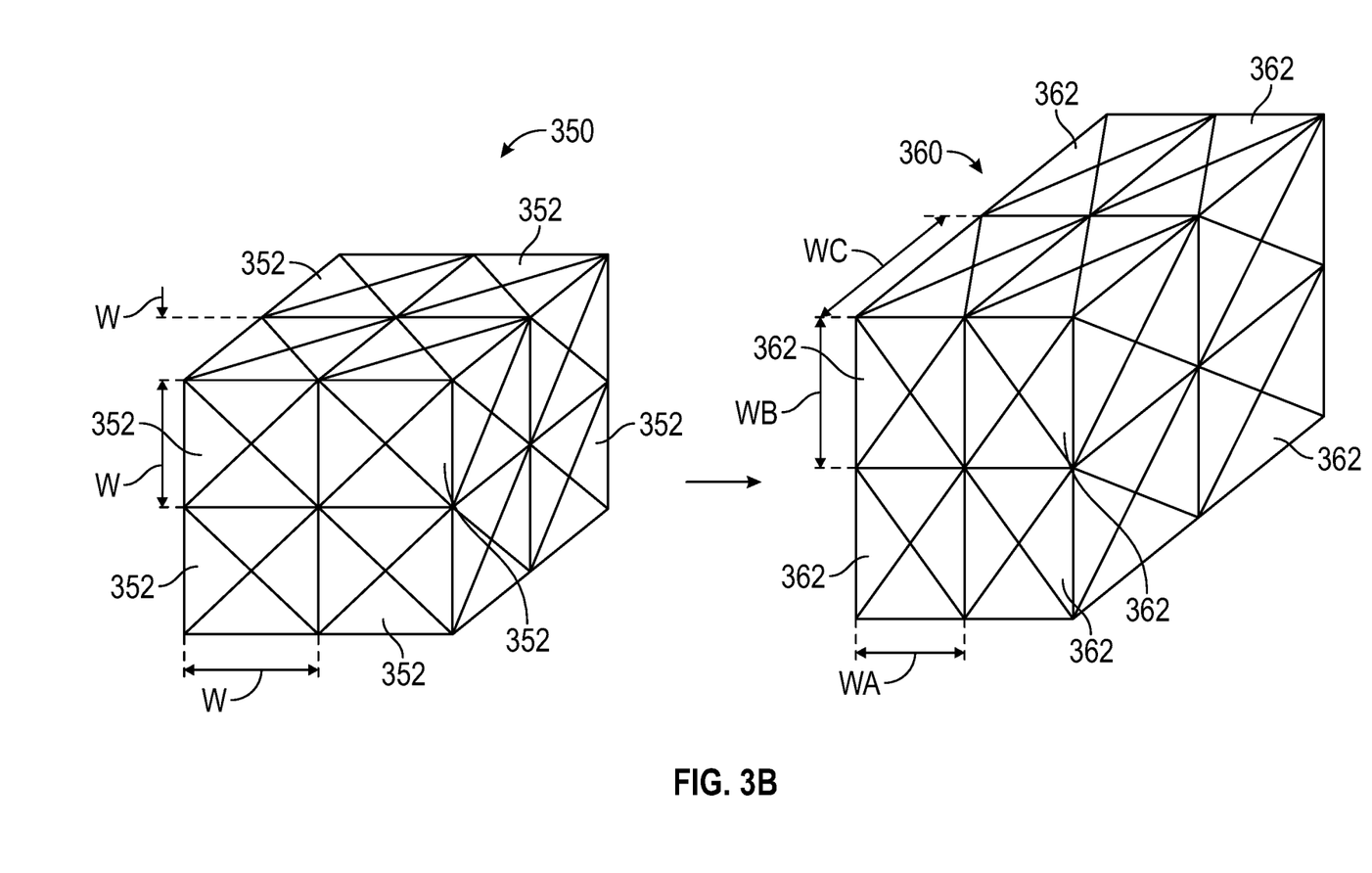
FIG. 3B is a schematic diagram illustrating modification of a unit cell to perform an adjustment of a lattice structure by a lattice adjustment engine, in accordance with some examples.

As discussed above, in further examples, an adjustment factor applied by the lattice adjustment engine 104 to a lattice structure of a 3D part can change a geometric property of the lattice structure by changing a geometric property of each unit cell of multiple unit cells according to a given unit cell type, where the multiple unit cells make up the lattice structure. FIG. 3B shows a lattice structure 350 having unit cells 352 according to a first unit cell type (e.g., a cuboid cell type). The cuboid cell type specifies use of cuboid unit cells. A cuboid unit cell 352 can have a same width W in all three axes of a cuboid as depicted in FIG. 3B.

The lattice adjustment engine 104 can adjust the lattice structure 350 by applying an adjustment factor to change the dimensions of each cuboid unit cell 352, to produce an adjusted lattice structure 360 having unit cells 362 with changed dimensions. The unit cells 362 are hexahedron unit cells with different dimensions along the different axes of the hexahedron. For example, in FIG. 3B, a hexahedron unit cell 362 can have widths WA, WB, and WC along the different axes of the hexahedron, where two or more of WA, WB, and WC are different.

When adjusting a lattice structure based on adjustment of each unit cell, zero-thickness beams can be used in each of the lattice structure 350 and the lattice structure 360. The lattice structure 350 has the original shape of the lattice structure as specified by an input representation of a 3D part, where the input representation specifies non-zero thickness beams. The lattice adjustment engine 104 produces the lattice structure 350 by substituting the non-zero thickness beams of the input representation with corresponding zero-thickness beams. Once the adjusted lattice structure 360 is produced by changing each unit cell, the lattice adjustment engine 104 can substitute the zero-thickness beams of the adjusted lattice structure 360 with non-zero thickness beams as specified by the input representation of the 3D part.

Figure 4:
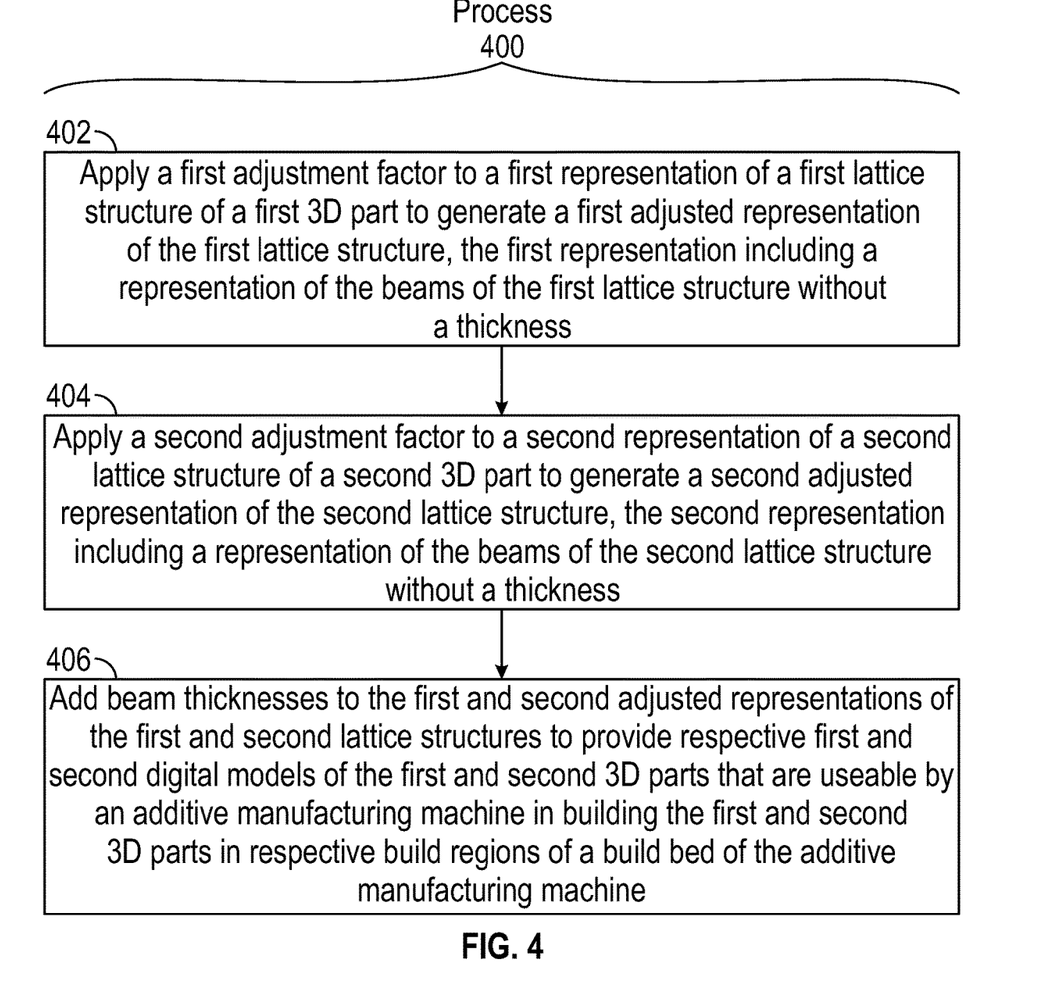
FIG. 4 is a flow diagram of a process according to some examples.

FIG. 4 is a flow diagram of a process 400 according to some examples. The process 400 may be performed by the lattice adjustment engine 104 of FIG. 1, for example.

The process 400 includes applying (at 402) a first adjustment factor to a first representation of a first lattice structure of a first 3D part to generate a first adjusted representation of the first lattice structure, the first representation including a representation of the beams of the first lattice structure without a thickness (e.g., zero-thickness beams 304 as shown in FIG. 3A).

The process 400 includes applying (at 404) a second adjustment factor to a second representation of a second lattice structure of a second 3D part to generate a second adjusted representation of the second lattice structure, the second representation including a representation of the beams of the second lattice structure without a thickness.

The process 400 includes adding (at 406) beam thicknesses to the first and second adjusted representations of the first and second lattice structures to provide respective first and second digital models of the first and second 3D parts that are useable by an additive manufacturing machine in building the first and second 3D parts in respective build regions of a build bed of the additive manufacturing machine. For example, the process 400 can add non-zero thickness beams (e.g., 314 in FIG. 3A) to the adjusted representation of the respective lattice structure that replace the zero-thickness beams. Note that beam thicknesses can vary in different portions of a 3D part.

In some examples, the process 400 includes receiving information about a variability of attributes of the 3D parts across the respective build regions of the build bed, and determining, based on the information about the variability of attributes, the first and second adjustment factors to apply.

In some examples, the first adjustment factor is for building the first 3D part in a first build region of the build bed, and the second adjustment factor is for building the second 3D part in a different second build region of the build bed. Additional adjustment factors can be used to build other 3D parts in other build regions of the build bed.

In some examples, an adjustment factor applied to a 3D part includes a scaling factor to scale a geometrical property of a lattice structure of the 3D part, or an adjustment factor to change a shape of the lattice structure. The scaling of the geometrical property or the changing of the shape of the lattice structure does not change a thickness of the beams of the lattice structure.

In some examples, adding of a beam thickness to an adjusted representation of a lattice structure includes adding the beam thickness specified by an input representation of a 3D part.

Figure 5:
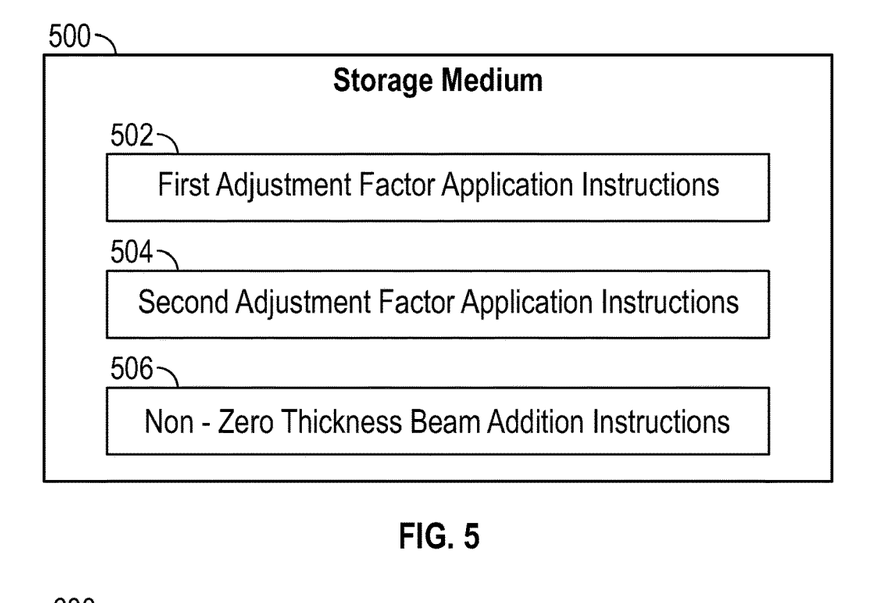
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system can include a computer (or multiple computers) and/or an additive manufacturing machine.

The machine-readable instructions include first adjustment application instructions 502 to apply a first adjustment factor to a first representation of a first lattice structure of a first 3D part to produce a first adjusted representation of the first lattice structure, the first lattice structure including zero thickness beams interconnecting nodes of the first lattice structure.

The machine-readable instructions include second adjustment application instructions 504 to apply a different second adjustment factor to a second representation of a second lattice structure of a second 3D part to produce a second adjusted representation of the second lattice structure, the second lattice structure including zero thickness beams interconnecting nodes of the second lattice structure. The first lattice structure and the second lattice structure are to be built in different build regions of a build bed of an additive manufacturing machine.

The machine-readable instructions include non-zero thickness beam addition instructions 506 to add non-zero thickness beams to the first and second adjusted representations of the respective first and second lattice structures to provide respective first and second digital models that are useable by the additive manufacturing machine in building the first and second 3D parts in the different build regions.

Figure 6:
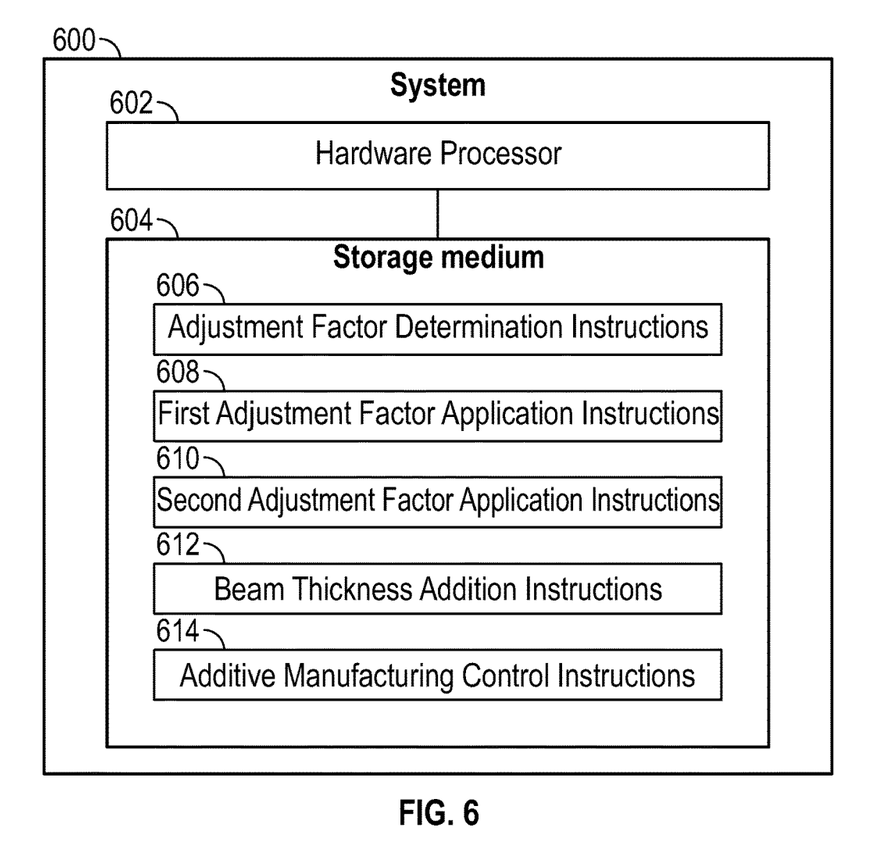
FIG. 6 is a block diagram of a system according to some examples.

FIG. 6 is a block diagram of a system 600 according to some examples. The system 600 can include a computer (or multiple computers) and/or an additive manufacturing machine.

The system 600 includes a hardware processor 602 (or multiple hardware processors). A hardware processor can include a microprocessor, a core of a multi-core microprocessor, a microcontroller, a programmable integrated circuit, a programmable gate array, or another hardware processing circuit.

The system 600 includes a storage medium 604 storing machine-readable instructions executable on the hardware processor 602 to perform various tasks. Machine-readable instructions executable on a hardware processor can refer to the instructions executable on a single hardware processor or the instructions executable on multiple hardware processors.

The machine-readable instructions in the storage medium 604 include adjustment factor determination instructions 606 to determine a plurality of adjustment factors to apply to lattice structures for building corresponding 3D parts using an additive manufacturing machine.

The machine-readable instructions in the storage medium 604 include first adjustment application instructions 608 to apply a first adjustment factor of the plurality of adjustment factors to a first representation of a first lattice structure to produce a first adjusted representation of the first lattice structure, the first representation of the first lattice structure including a representation of the beams of the first lattice structure without a thickness.

The machine-readable instructions in the storage medium 604 include second adjustment application instructions 610 to apply a second adjustment factor of the plurality of adjustment factors to a second representation of a second lattice structure to produce a second adjusted representation of the second lattice structure, the second representation of the second lattice structure including a representation of the beams of the second lattice structure without a thickness.

The machine-readable instructions in the storage medium 604 include beam thickness addition instructions 612 to add a beam thickness to the first and second adjusted representations of the first and second lattice structures to provide respective first and second digital models of the first and second 3D parts.

The machine-readable instructions in the storage medium 604 include additive manufacturing control instructions 614 to control the additive manufacturing machine using the first and second digital models in building the first and second 3D parts.

A storage medium (e.g. 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a hardware processor, a wired representation of a lattice structure of a three-dimensional (3D) part to be additively manufactured within a build chamber of an additive manufacturing apparatus, wherein
      the wired representation defines the lattice structure as a plurality of nodes at specified positions and interconnected by a plurality of struts, without defining thickness of the struts;
   receiving, by the hardware processor, a mechanical property that the lattice structure of the 3D part is to have upon being additively manufactured by the additive manufacturing apparatus;
   identifying, by the hardware processor, a location within the build chamber at which the 3D part is to be additively manufactured by the additive manufacturing apparatus;
   applying, by the hardware processor, an adjustment factor to the wired representation of the lattice structure as a function of the location within the build chamber at which the 3D part is to be additively manufactured, to generate an adjusted wired representation of the first lattice structure that still does not define the thickness of the struts of the lattice structure; and
   specifying, by the hardware processor, the thickness of the struts of the lattice structure within the adjusted wired representation such that the lattice structure satisfies the mechanical property upon being additively manufactured by the additive manufacturing apparatus at the identified location within the build chamber in accordance with the adjusted wire representation of the lattice structure.

2. The method of claim 1, wherein the thickness of the struts is not specified until after the adjusted wired representation of the lattice structure has been generated because, in order for the lattice structure to satisfy the mechanical property upon being additively manufactured, the thickness of the struts differs depending on how the wired representation of the lattice structure is adjusted to generate the adjusted wired representation, where the wired representation in turn is adjusted as a function of the location within the build chamber at which the 3D part is to be additively manufactured.

3. The method of claim 1, wherein the adjustment factor comprises a scaling factor to scale a geometrical property of the lattice structure of the 3D part, and wherein the geometrical property of the lattice structure is not to be confused with the mechanical property that the lattice structure of the 3D part is to satisfy upon the 3D part being additively manufactured.

4. The method of claim 3, wherein the geometrical property of the lattice structure comprises an overall size of the lattice structure.

5. The method of claim 3, wherein the geometrical property of the first lattice structure comprises the specified positions of the nodes within the first lattice structure.

6. The method of claim 1, wherein the adjustment factor is to adjust an overall shape of the wired representation of the lattice structure.

7. The method of claim 1, wherein the wired representation of the lattice structure comprises a plurality of unit cells according to a unit cell type, and the first adjustment factor is to adjust one or more of the unit cells of the wired representation.

8. The method of claim 1, wherein the mechanical property comprises one or a combination of more than one of compressibility, stiffness, density, and mechanical strength of the lattice structure upon being additively manufactured.

9. The method of claim 1, wherein mechanical property comprises one or a combination of more than one of kinetic energy dissipation, kinetic energy return, and deceleration provided by and/or due to the lattice structure.

10. The method of claim 1, further comprising causing the additive manufacturing apparatus to additively manufacture the 3D part at the identified location within the build chamber, including causing the additive manufacturing apparatus to additively manufacture the lattice structure of the 3D part in accordance with the adjusted wire representation such that the lattice structure satisfies the mechanical property.

11. A non-transitory machine-readable medium storing instructions executable by a hardware processor to perform processing comprising:
receiving a wired representation of a lattice structure of a three-dimensional (3D) part to be additively manufactured within a build chamber of an additive manufacturing apparatus, wherein
the wired representation defines the lattice structure as a plurality of nodes at specified positions and interconnected by a plurality of struts, without defining thickness of the struts;
receiving a mechanical property that the lattice structure of the 3D part is to have upon being additively manufactured by the additive manufacturing apparatus;
identifying a location within the build chamber at which the 3D part is to be additively manufactured by the additive manufacturing apparatus;
applying an adjustment factor to the wired representation of the lattice structure as a function of the location within the build chamber at which the 3D part is to be additively manufactured, to generate an adjusted wired representation of the lattice structure that still does not define the thickness of the struts of the lattice structure;
specifying the thickness of the struts of the lattice structure within the adjusted wired representation such that the lattice structure satisfies the mechanical property upon being additively manufactured by the additive manufacturing apparatus at the identified location within the build chamber in accordance with the adjusted wire representation of the lattice structure; and
causing the additive manufacturing apparatus to additively manufacture the 3D part at the identified location within the build chamber, including causing the additive manufacturing apparatus to additively manufacture the lattice structure of the 3D part in accordance with the adjusted wire representation such that the lattice structure satisfies the mechanical property.

12. The non-transitory machine-readable medium of claim 11, wherein the thickness of the struts is not specified until after the adjusted wired representation of the lattice structure has been generated because, in order for the lattice structure to satisfy the mechanical property upon being additively manufactured, the thickness of the struts differs depending on how the wired representation of the lattice structure is adjusted to generate the adjusted wired representation, where the wired representation in turn is adjusted as a function of the location within the build chamber at which the 3D part is to be additively manufactured.

13. The non-transitory machine-readable medium of claim 11, wherein the adjustment factor comprises a scaling factor to scale a geometrical property of the lattice structure of the 3D part,
wherein the geometrical property of the lattice structure is not to be confused with the mechanical property that the lattice structure of the 3D part is to satisfy upon the 3D part being additively manufactured, and
wherein the geometrical property of the lattice structure comprises either or both of an overall size of the lattice structure and the specified positions of the nodes within the lattice structure.

14. The non-transitory machine-readable medium of claim 11, wherein the adjustment factor is to either or both of:
adjust an overall shape of the wired representation of the lattice structure; and
adjust one or more of a plurality of unit cells of the wired representation of the lattice structure that are in accordance with a unit cell type.

15. The non-transitory machine-readable medium of claim 11, wherein the mechanical property comprises one or a combination of more than one of:
one or a combination of more than one of compressibility, stiffness, density, and mechanical strength of the lattice structure upon being additively manufactured; and
one or a combination of more than one of kinetic energy dissipation, kinetic energy return, and deceleration provided by and/or due to the lattice structure.

16. A system comprising:
a hardware processor; and
a non-transitory machine-readable medium soring instructions executable by the hardware processor to perform processing comprising:
receiving a wired representation of a lattice structure of a three-dimensional (3D) part to be additively manufactured within a build chamber of an additive manufacturing apparatus, wherein
the wired representation defines the lattice structure as a plurality of nodes at specified positions and interconnected by a plurality of struts, without defining thickness of the struts;
receiving a mechanical property that the lattice structure of the 3D part is to have upon being additively manufactured by the additive manufacturing apparatus;
identifying a location within the build chamber at which the 3D part is to be additively manufactured by the additive manufacturing apparatus;
applying an adjustment factor to the wired representation of the lattice structure as a function of the location within the build chamber at which the 3D part is to be additively manufactured, to generate an adjusted wired representation of the lattice structure that still does not define the thickness of the struts of the lattice structure; and specifying the thickness of the struts of the lattice structure within the adjusted wired representation such that the lattice structure satisfies the mechanical property upon being additively manufactured by the additive manufacturing apparatus at the identified location within the build chamber in accordance with the adjusted wire representation of the lattice structure.

17. The system of claim 16, wherein the adjustment factor comprises a scaling factor to scale a geometrical property of the lattice structure of the 3D part, wherein the geometrical property of the lattice structure is not to be confused with the mechanical property that the lattice structure of the 3D part is to satisfy upon the 3D part being additively manufactured, and wherein the geometrical property of the lattice structure comprises either or both of an overall size of the lattice structure and the specified positions of the nodes within the lattice structure.

18. The system of claim 16, wherein the adjustment factor is to either or both of:

adjust an overall shape of the wired representation of the lattice structure; and adjust one or more of a plurality of unit cells of the wired representation of the lattice structure that are in accordance with a unit cell type.

19. The system of claim 16, wherein the mechanical property comprises one or a combination of more than one of:

one or a combination of more than one of compressibility, stiffness, density, and mechanical strength of the lattice structure upon being additively manufactured; and one or a combination of more than one of kinetic energy dissipation, kinetic energy return, and deceleration provided by and/or due to the lattice structure.

20. The system of claim 16, further comprising:

the additive manufacturing apparatus that is configured to additively manufacture the 3D part at the identified location within the build chamber, including additively manufacturing the lattice structure of the 3D part in accordance with the adjusted wire representation such that the lattice structure satisfies the mechanical property.

* * * * *